(12) United States Patent
Pearson et al.

(10) Patent No.: US 7,836,038 B2
(45) Date of Patent: Nov. 16, 2010

(54) METHODS AND SYSTEMS FOR INFORMATION EXTRACTION

(75) Inventors: Mark Pearson, Berkeley, CA (US); Craig Nevill-Manning, New York, NY (US); Abhinay Sharma, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 851 days.

(21) Appl. No.: 10/731,916

(22) Filed: Dec. 10, 2003

(65) Prior Publication Data

US 2005/0131764 A1    Jun. 16, 2005

(51) Int. Cl.
G06F 17/30    (2006.01)
(52) U.S. Cl. ...................................... 707/706
(58) Field of Classification Search ............... 707/6, 707/3, 5; 715/513, 522; 705/26
See application file for complete search history.

(56) References Cited

U.S. PATENT DOCUMENTS

| | | | |
|---|---|---|---|
| 5,982,369 A | | 11/1999 | Sciammarella et al. |
| 6,009,442 A | * | 12/1999 | Chen et al. ............... 715/522 |
| 6,037,939 A | | 3/2000 | Kashiwagi et al. |
| 6,058,417 A | | 5/2000 | Hess et al. |
| 6,237,011 B1 | | 5/2001 | Ferguson et al. |
| 6,271,840 B1 | * | 8/2001 | Finseth et al. ............... 715/513 |
| 6,289,353 B1 | | 9/2001 | Hazlehurst et al. |
| 6,298,174 B1 | | 10/2001 | Lantrip et al. |
| 6,332,135 B1 | | 12/2001 | Conklin et al. |
| 6,369,840 B1 | | 4/2002 | Barnett et al. |
| 6,567,980 B1 | | 5/2003 | Jain et al. |
| 6,606,625 B1 | | 8/2003 | Muslea et al. |
| 6,615,184 B1 | | 9/2003 | Hicks |
| 6,647,383 B1 | | 11/2003 | August et al. |
| 6,678,681 B1 | * | 1/2004 | Brin ............................. 707/6 |
| 6,728,706 B2 | * | 4/2004 | Aggarwal et al. ............... 707/5 |
| 6,732,161 B1 | | 5/2004 | Hess et al. |
| 6,785,671 B1 | * | 8/2004 | Bailey et al. ............... 707/3 |
| 6,853,982 B2 | | 2/2005 | Smith et al. |
| 6,920,609 B1 | | 7/2005 | Manber et al. |
| 7,013,289 B2 | * | 3/2006 | Horn et al. ............... 705/26 |
| 7,058,598 B1 | | 6/2006 | Chen et al. |

(Continued)

FOREIGN PATENT DOCUMENTS

EP    0964341 A2    12/1999

(Continued)

OTHER PUBLICATIONS

Venkatraman WO/0113273.*

(Continued)

*Primary Examiner*—Don Wong
*Assistant Examiner*—Sheree N Brown
(74) *Attorney, Agent, or Firm*—Fenwick & West LLP

(57) ABSTRACT

Systems and methods that identify and extract information from articles are described. In one embodiment, a search engine implements a method comprising receiving a plurality of articles, and identifying at least a first article as a shopping article. The method can further comprise receiving a search query for an item, selecting the first article as associated with the search query, and identifying a first attribute associated with a first item relevant to the search query from the first article based at least in part on the search query.

30 Claims, 3 Drawing Sheets

U.S. PATENT DOCUMENTS

| | | | |
|---|---|---|---|
| 7,076,443 | B1 | 7/2006 | Emens et al. |
| 7,080,070 | B1 | 7/2006 | Gavarini |
| 7,092,936 | B1 | 8/2006 | Alonso et al. |
| 7,096,426 | B1* | 8/2006 | Lin-Hendel ................. 715/711 |
| 7,103,592 | B2 | 9/2006 | Huret |
| 7,124,129 | B2 | 10/2006 | Bowman et al. |
| 7,127,416 | B1 | 10/2006 | Tenorio |
| 7,149,804 | B2 | 12/2006 | Chatani |
| 7,315,864 | B2* | 1/2008 | Valentine ..................... 707/754 |
| 7,461,024 | B2* | 12/2008 | Montgomery ................ 705/37 |
| 2001/0037334 | A1* | 11/2001 | Valentine ..................... 707/10 |
| 2001/0056418 | A1 | 12/2001 | Youn |
| 2002/0007339 | A1* | 1/2002 | Hogendoorn ................ 705/37 |
| 2002/0032612 | A1* | 3/2002 | Williams et al. ............. 705/26 |
| 2002/0038282 | A1* | 3/2002 | Montgomery ................ 705/37 |
| 2002/0065722 | A1 | 5/2002 | Hubbard et al. |
| 2002/0099622 | A1 | 7/2002 | Langhammer |
| 2002/0161658 | A1 | 10/2002 | Sussman |
| 2002/0174076 | A1 | 11/2002 | Bertani |
| 2002/0194074 | A1* | 12/2002 | Jacobs ......................... 705/16 |
| 2003/0028446 | A1 | 2/2003 | Akers et al. |
| 2003/0050865 | A1 | 3/2003 | Dutta et al. |
| 2003/0105680 | A1 | 6/2003 | Song et al. |
| 2003/0126095 | A1* | 7/2003 | Allen .......................... 705/80 |
| 2003/0167209 | A1 | 9/2003 | Hsieh |
| 2004/0073625 | A1 | 4/2004 | Chatani |
| 2004/0107142 | A1 | 6/2004 | Tomita et al. |
| 2005/0021997 | A1 | 1/2005 | Benyon et al. |
| 2005/0071255 | A1 | 3/2005 | Wang et al. |
| 2005/0075940 | A1 | 4/2005 | DeAngelis |
| 2005/0183041 | A1 | 8/2005 | Chiu et al. |

FOREIGN PATENT DOCUMENTS

| | | | |
|---|---|---|---|
| WO | WO 01/13273 | A2 | 2/2001 |
| WO | WO0113273 | * | 2/2001 |
| WO | WO 01/46870 | A1 | 6/2001 |
| WO | WO 01/97143 | A2 | 12/2001 |

OTHER PUBLICATIONS

International Search Report and Written Opinion, PCT/US2004/038559, Mar. 16, 2005.

Kushmerick, Nicholas, "Wrapper induction: Efficiency and expressiveness," Artificial Intelligence, 2000, pp. 15-68, 118, Elsevier Science B.V.

Brin, Sergey et al., "The Anatomy of a Large-Scale Hypertextual Web Search Engine," 1998, Computer Science Department, Stanford University, Stanford, CA.

Laender, Alberto et al., "A Brief Survey of Web Data Extraction Tools," 2002, Department of Computer Science, Federal University of Minas Gerais, Belo Horizonte MG Brazil.

Kushmerick, Nicholas, "Finite-state approaches to Web information extraction," 2002, Computer Science Department, University College Dublin.

Kushmerick, Nicholas et al., "Adaptive Information extraction: Core technologies for information agents," 2002, Computer Science Department, University College Dublin.

Chang, Chia-Hu et al., "IEPAD: Information Extraction Based on Pattern Discovery," 2001, Dept. of Computer Science and Information Engineering, National Central University, Chung-Li, Taiwan.

Muslea, Ion et al., "Hierarchical Wrapper Induction for Semistructured Information Sources," 1999, pp. 1-27, Kluwer Academic Publishers, the Netherlands.

Hsu, Chun-Nan et al., "Generating Finite-State Transducers for Semi-Structured Data Extraction from the Web," Information Systems, 1998, pp. 521-538, vol. 23, No. 8, Elsevier Science Ltd., Great Britain.

Crescenzi, Valter et al., "Road Runner: Towards Automatic Data Extraction from Large Web Sites," Proceedings of the 27$^{th}$ VLDB Conference, 2001, Rome, Italy.

Freitag, Dayne et al., "Boosted Wrapper Induction," 2000, American Association for Artificial Intelligence.

Michael White et al., "Multidocument Summarization via Information Extraction," First International Conference on Human Language Technology Research (HLT), 2001.

J.-Y. Delort et al., "Enhanced Web Document Summarization Using Hyperlinks," HT'03, Aug. 26-30, 2003, Nottingham, United Kingdom.

BizRate.com web page, as provided by Internet Archive Wayback Machine at http://web.archive.org/web/20030101-20030922re_/http://bizrate.com/, as published between Jan. 1, 2003 and Sep. 22, 2003.

DealTime.com web page, as provided by Internet Archive Wayback Machine at http://web.archive.org/web/20030101-20030922re_/http://dealtime.com/, as published between Jan. 1, 2003 and Sep. 22, 2003.

Sherman, C., "Yahoo! Launches New Product Search," Sep. 23, 2003, SearchEngineWatch, [online] [Retrieved on Sep. 1, 2006] Retrieved from the Internet<URL:http://searchenginewatch.com/showPage.html?page=3081551>.

Yahoo Shopping web page, as provided by Internet Archive Wayback Machine at http://web.archive.org/web/20030101-20030922re_/http://shopping.yahoo.com/, as published between Jan. 1, 2003 and Sep. 22, 2003.

Archive of "mySimon: Compare products and prices from around the Web," www.mysimon.com/index.jhtml, [online] [Archived by http://archive.org on Jun. 3, 2003; Retrieved on Jan. 10, 2007] Retrieved from the InternetURL:http://web.archive.org/web/20030603175323/www.mysimon.com/index.jhtml>.

Archive of "mySimon: Frequently Asked Questions," www.mysimon.com/corporate/index.jhtml?pgid=help, [online] [Archived by http://archive.org on Jun. 4, 2001; Retrieved on Jan. 10, 2007] Retrieved from the Internet<URL:http://web.archive.org/web/20010604082923/www.mysimon.com/corporate/index.jhtml?pgid=help>.

Archive of "mySimon: Make mySimon your homepage," www.mysimon.com/Nikon_Coolpix_5700/4014-650..., [online] [Archived by http://archive.org on Dec. 7, 2003; Retrieved on Sep. 7, 2006] Retrieved from the Internet<URL:http://web.archive.org/web/20031207141726/www.mysimon.com/Nikon_Coolpix_5700/4014-650....>.

Archive of "mySimon: Merchant Info," www.mysimon.com/corporate/index.jhtml?pgid=help, [online] [Archived by http://archive.org on Jun. 3, 2003; Retrieved on Jan. 10, 2007] Retrieved from the Internet<URL:http://web.archive.org/web/20030603173203/www.mysimon.com/corporate/index.jhtml?pgid=help>.

Archive of "mySimon: Shopping Guides," www.mysimon.com/index.anml, [online] [Archived by http://archive.org on May 10, 2000; Retrieved on Jan. 10, 2007] Retrieved from the Internet<URL:http://web.archive.org/web/20000510222151/www.mysimon.com/index.anml>.

Archive of "mySimon: What is mySimon," www.mysimon.com/about_mysimon/companymeet..., [online] [Archived by http://archive.org on May 10, 2000; Retrieved on Sep. 12, 2006] Retrieved from the Internet<URL:http://web.archive.org/web/20000510054852/www.mysimon.com/about$_{13}$ mysimon/company/meet...>.

Newegg.com, Information from Web Archive.org at http://Web.archive.org/web/20020925093014/http://newegg.com/, Sep. 25, 2002.

Chinese Office Action, Chinese Application No. 2004800364360, Feb. 15, 2008, 17 pages.

Chinese Office Action and Translation, Chinese Application No. 200480036436.0, Feb. 20, 2009, 5 pages.

Examination Report for European Patent Application No. EP04811314.6, Nov. 9, 2009, 5 Pages.

Examiner's First Report on Australia Patent Application No. 2004304285, Nov. 10, 2009, 2 pages.

* cited by examiner

METHODS AND SYSTEMS FOR INFORMATION EXTRACTION

FIELD OF THE INVENTION

The invention generally relates to information extraction. More particularly, the invention relates to methods and systems for extracting information from articles.

BACKGROUND OF THE INVENTION

A search engine or search engine program is a widely used mechanism for allowing users to search vast numbers of documents for information. Automated general search engines locate documents, such as web pages, by matching terms from a user entered search query to an indexed corpus of web pages. A conventional network search engine, such as the Google™ search engine, returns a search result set in response to the search query submitted by the user. The search result set can comprise a ranked list of documents with a link to each document and a summary of the document can be returned to the user. The search engine can rank or sort the individual articles or documents in the result set based on a variety of measures, such as, the number of times the search terms appear in the document and the number of documents that contain a link to a document. For example, one known method, described in an article entitled "The Anatomy of a Large-Scale Hypertextual Search Engine," by Sergey Brin and Lawrence Page, assigns a degree of importance to a document, such as a web page, based on the link structure of the web page.

Many documents, such as web pages, present items for sale. Such shopping documents allow users to purchase items, either directly, such as by clicking on a link, or indirectly. Users wishing to compare prices on an item from different vendors can enter a query for the item in a general search engine and obtain a list of relevant documents. Similarly, there may be different versions of the item and the user may desire to see which version each vendor carries. In order to compare prices or versions the user must visit every document presenting the item for sale. Additionally, documents may be present in the search result set that are not shopping documents, but only discuss the item, such as reviews.

It is desirable to present to the user certain attributes of an item, such as price, version, and an image, from relevant documents in a search result set in response to a search query for the item. Manually searching through a vast number of documents to extract attributes of the item can be extremely time consuming and impractical for a large number of documents.

Thus, a need exists to automatically extract product information from a document in response to a search query from a user.

SUMMARY

Embodiments of the present invention comprise methods and systems for identifying and extracting information from articles. In one embodiment, a search engine implements a method comprising receiving a plurality of articles, and identifying at least a first article as a shopping article. The method can further comprise receiving a search query for an item, selecting the first article as associated with the search query, and identifying a first attribute associated with a first item relevant to the search query from the first article based at least in part on the search query. Additional aspects of the present invention are directed to computer systems and to computer-readable media having features relating to the foregoing aspects.

Further details and advantages of embodiments of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
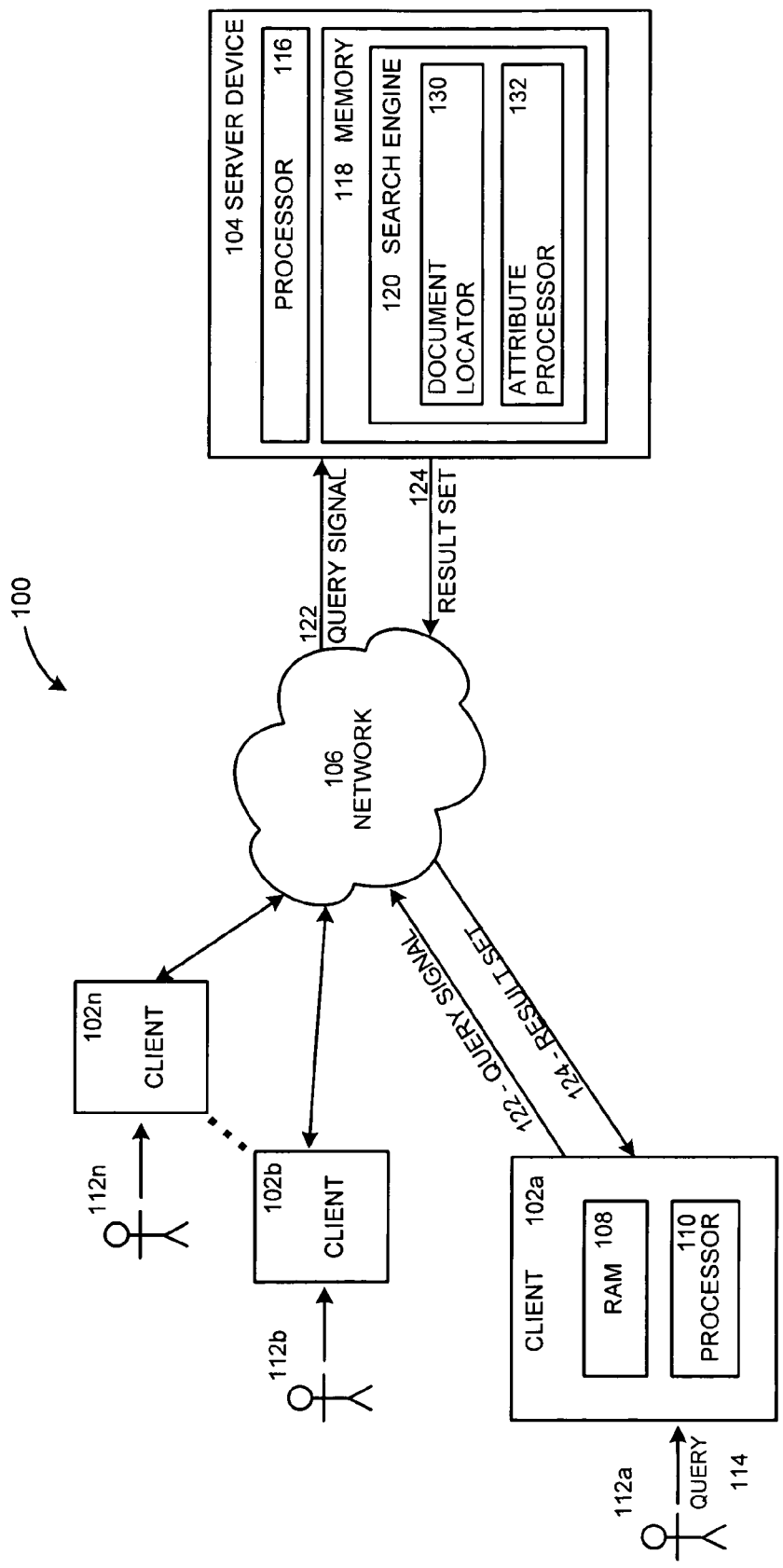
FIG. 1 is a diagram illustrating an exemplary environment in which one embodiment of the present invention may operate.

The present invention comprises methods and systems for information extraction. Referring now to the drawings in which like numerals indicate like elements throughout the several figures, FIG. 1 is a block diagram illustrating an exemplary environment for implementation of an embodiment of the present invention. The system 100 shown in FIG. 1 includes multiple client devices 102a-n in communication with a server device 104 over a network 106. The network 106 shown includes the Internet. In other embodiments, other networks, such as an intranet may be used. Moreover, methods according to the present invention may operate within a single computer.

The client devices 102a-n shown each includes a computer-readable medium, such as a random access memory (RAM) 108 coupled to a processor 110. The processor 110 executes computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102a-n may also include a number of external or internal devices such as a mouse, a CD-ROM, DVD, a keyboard, a display, or other input or output devices.

Examples of client devices 102*a-n* are personal computers, digital assistants, personal digital assistants, cellular phones, mobile phones, smart phones, pagers, digital tablets, laptop computers, Internet appliances, and other processor-based devices. In general, a client device 102*a* may be any type of processor-based platform that is connected to a network 106 and that interacts with one or more application programs. Client devices 102*a-n* may operate on any operating system capable of supporting a browser or browser-enabled application, such as Microsoft® Windows® or Linux. The client devices 102*a-n* shown include, for example, personal computers executing a browser application program such as Microsoft Corporation's Internet Explorer™, Netscape Communication Corporation's Netscape Navigator™, and Apple Computer, Inc.'s Safari™.

Through the client devices 102*a-n*, users 112*a-n* can communicate over the network 106 with each other and with other systems and devices coupled to the network 106. As shown in FIG. 1, a server device 104 is also coupled to the network 106. In the embodiment shown, a user 112*a-n* generates a search query 114 at a client device 102*a*. The client device 102*a* transmits the query 114 to the server device 104 via the network 106. For example, a user 112*a* types a textual search query regarding an item into a query field of a web page of a shopping search engine interface or other client-side software displayed on the client device 102*a*, which is then transmitted via the network 106 to the server device 104. In the embodiment shown, a user 112*a* inputs a search query 114 at a client device 102*a*, which transmits an associated search query signal 122 reflecting the search query 114 to the server device 104. The search query 114 may be transmitted directly to the server device 104 as shown. In another embodiment, the query signal 122 may instead be sent to a proxy server (not shown), which then transmits the query signal 122 to server device 104. Other configurations are possible.

The server device 104 shown includes a server executing a shopping search engine application program, such as the Froogle™ search engine. Similar to the client devices 102*a-n*, the server device 104 shown includes a processor 116 coupled to a computer-readable memory 118. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains the shopping search engine application program, also known as a search engine 120. The search engine 120 locates relevant items in articles in response to a search query 114 from a user 112*a-n*. Items can include, for example, products, goods, services, and any other thing offered for sale. The search engine 120 then provides the result set 124 to the client 102*a* via the network 106. The result set 124 can include a ranked list of items, attributes for each item, such as a price and an image, and a link to each article containing the item, such as a web page. The search engine also comprises a document locator 130 and an attribute processor 132. In the embodiment shown, each comprises computer code residing in memory 118.

In the embodiment shown, the server device 104, or related device, locates articles, such as web pages, stored at other devices or systems connected to the network 106, and indexes the articles in memory 118 or on another data storage device prior to receiving and processing a search query 114. Articles include, for example, web pages of various formats, such as HTML, XML, XHTML, Portable Document Format (PDF) files, and word processor, database, and application program document files, audio, video, or any other documents or information of any type whatsoever made available on a network (such as the Internet), a personal computer, or other computing or storage means. The embodiments described herein are described generally in relation to HTML files or documents, but embodiments may operate on any type of article, including any type of image. During or after the crawl of the network the server device 104 or other device can determine if any of the documents crawled are shopping documents. A shopping document is a document that presents items for sale and in which the items can be purchased through interaction with the document or related documents.

In response to a search query signal 122, the document locator 130 identifies shopping documents that contain items relevant to the search query signal 122. A shopping document can contain a single item or multiple items relevant to the search query. Shopping documents can contain attributes of the items, such as, for example, the price of the item, an image of the item, a SKU number for the item, and a version of the item. The attribute processor 132 identifies and extracts certain attributes associated with the item or items relevant to the search query. In one embodiment, the attribute processor 132 identifies and extracts the price of the item and an image associated with the item from the documents located by the document locator 130 that are relevant to the search query. Other functions and characteristics of the document locator 130 and attribute processor 132 are further described below.

It should be noted that the present invention may comprise systems having a different architecture than that which is shown in FIG. 1. For example, in some systems according to the present invention, the attribute processor 132 may be located external to the search engine 120 and may perform its functions offline before a search query from a user. The system 100 shown in FIG. 1 is merely exemplary, and is used to explain the exemplary methods shown in FIGS. 2 and 3.

Various methods in accordance with the present invention may be carried out. For example, in one embodiment a plurality of articles are received, at least one price representation in a first article is identified, at least one shopping character string in a link element or a form element of the first article is identified, and an indication that the first article is a shopping article is provided. The price representation can be a currency symbol followed by a number followed by a period or comma followed by two single digit numbers. The character string can occur in a uniform resource locator (URL), parameter or value of an HTML form element, such as <FORM>, <INPUT>, or <IMAGE> or a URL in an HTML <A> tag. The character string can be "add to cart", "add to basket", "add to shopping bag", "update order", "cart", "basket", and "checkout".

In one embodiment, a search query for an item is received, a first article associated with the search query is selected, a first attribute associated with the item from the first article based at least in part on the search query is identified, a second attribute associated with the item based at least in part on the search query and the first attribute is identified, and the first attribute and the second attribute from the first article are extracted. The search query can be entered by a user or can be generated by the search engine or search engine administrator. Attributes can be extracted from a plurality of articles and each item can be ranked. The list of ranked items can be presented to a user as a search result set. Alternatively, the search engine can index and store the extracted attributes.

The first attribute and second attribute can be identified in a variety of ways. For example, the first attribute and the second attribute can be identified based at least in part on a structure of the first article. The identification of the first attribute and the second attribute can comprise determining a relationship between each attribute and a query term. The first article can have a tree structure and the identification of the first attribute and the second article can comprise determining a number of words between each attribute and a query term, determining a distance from each attribute and a query term to a closest common ancestor, determining a number of nodes in a smallest tree that contains both the first attribute and a query term and the second attribute and a query term, determining a depth to a smallest tree containing both the first attribute and a query term and the second attribute and a query term, determining a distance between the first attribute and the second attribute. The identification of the first attribute and the second attribute can also comprise determining global information associated with articles related to the first article. The identification of the first attribute and the second attribute can be performed simultaneously or it can be performed serially, such as determining the first attribute and then determining the second attribute.

In one embodiment, the first attribute is a price associated with the item and the second attribute is an image associated with the item. Identifying the price can comprise determining a price representation score, determining a font size of the price, determining a font face of the price, determining words immediately preceding the price, and determining words immediately following the price. Identifying the image can comprise determining an aspect ratio associated with the image, and determining a frequency of occurrence value associated with the image.

Figure 2:
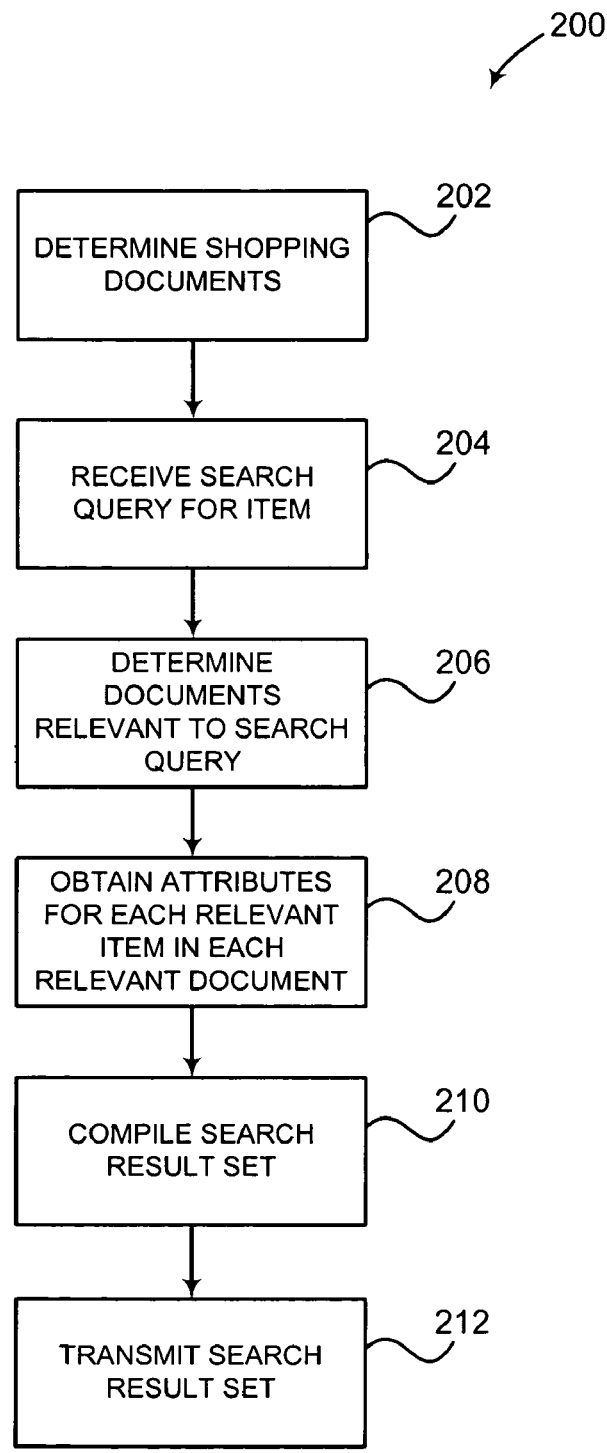
FIG. 2 is a flow diagram illustrating a method of identifying and extracting item attributes from articles in one embodiment of the present invention.

FIG. 2 illustrates an exemplary method 200 that provides a method for identifying and extracting item attributes from documents. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the search engine 120 identifies shopping documents. A shopping document is a document that presents items for sale and in which the items can be purchased through interaction with the document or related documents. The search engine 120 can determine shopping documents during the crawl of the network 106 or after the crawl of the network 106. The search engine 120 can provide an indication, such as a flag, in an index of crawled documents for each document that is identified as a shopping document.

In order to determine whether a document is a shopping document, the search engine 120 can detect specific formatting characteristics of the document that indicate that the document presents items for sale. User-visible features of documents are sometimes unreliable, because documents frequently discuss items for sale without actually offering them for sale, for example, a review of an item. The search engine 120 thus can focus on the not user-visible, mechanical aspects of a document in determining whether it is a shopping document. For example, in the case of an HTML document, the search engine 120 can determine if there are any form elements or link elements of the document that indicate that the document is a shopping document. The search engine 120 can search for character strings occurring in a URL, parameter or value of an HTML form element, such as <FORM>, <INPUT>, or <IMAGE> or a URL in an HTML <A> tag. For example, the following character strings in a form or link element indicate a shopping document: "add to cart", "add to basket", "add to shopping bag", "update order"; "cart", "basket", and "checkout". A variety of other similar character strings can indicate a shopping document. In determining whether a document is a shopping document, the search engine 120 can also determine if a price occurs on the document. Specifically, the search engine 120 can identify if the document contains a price representation. A price representation can be currency symbol followed by a number, followed by a period, followed by two single digit numbers, such as "$15.89". Similarly, the search engine can identify other monetary currency symbols other than "$" and can look for a comma instead of a period indicating the fraction of a currency, for example €15.89.

In 204, the search engine 120 receives a search query signal 122 from a client device 102a via the network 106. A user 112a can input text representing an item the user wishes to purchase or gain information on the purchase of into a client device 102a. The client device can create an associated search query signal 122 representative of the search query 114 input by the user and transmit the search query signal 122 to the server device 104 via the network 106. For example, if the user 112a is interested in purchasing a camera, the user can input "camera" in the client device 102a and the client device can send an associated search query signal 122 to the server device 104. Alternatively, the search engine 120 or a search engine administrator can generate a search query regarding an item or items to enable the extraction of item attributes from documents.

In 206, the document locator 130 identifies shopping documents relevant to the item requested in the search query. For the example search query "camera", the document locator 130 can attempt to locate all shopping documents presenting cameras for purchase. The document locator 130 can identify relevant shopping documents using conventional techniques, such as, for example, matching the terms of the search query with the indexed terms from the shopping documents.

In 208, for each shopping document identified by the document locator 130 in step 206 certain attributes associated with the item or items contained in the document are identified and extracted by the attribute processor 132. Attributes for an item can include, for example, an item name, a price of the item, an image of the item, a SKU number for the item, a version of the item, a description of the item, and other information relating to the item. An attribute for an item in a document can be identified based on a variety of factors, such as the terms of the query, the structure of the document, global information from related documents, and other identified or potential attributes.

For example, the attribute processor 132 can identify potential attributes of the item by determining the relationship of a potential attribute and terms used in the search query. This relationship can be determined based on a variety of distance metrics and structure metrics based on the structure of the document. For example, the attribute processor 132 can determine a relationship by determining the distance of a potential attribute from the terms of the query, the location of a potential attribute in the structure of the document, and the font size and face of a potential attribute. The attribute processor 132 can also use the relationship in the document between potential attributes in the determination of attributes for an item. It is possible to identify and extract multiple attributes for each item. For example, the attribute processor can identify and extract an item title based on the query terms, and then use this attribute and the query terms in identifying and extracting a price for the item, and use the extracted two attributes and the query terms in identifying and extracting an image for the item. By biasing the selection of attributes to things near each other in the document, the quality of the selected attributes can be increased. Global information used by the attribute processor 132 in identifying and selecting attributes associated with items can include, for example, the number of documents from a particular vendor or host, the number of times an image is referenced on the network, and the size of an image. The attribute processor 132 can determine different attributes for an item simultaneously or one at a time.

Figure 3:
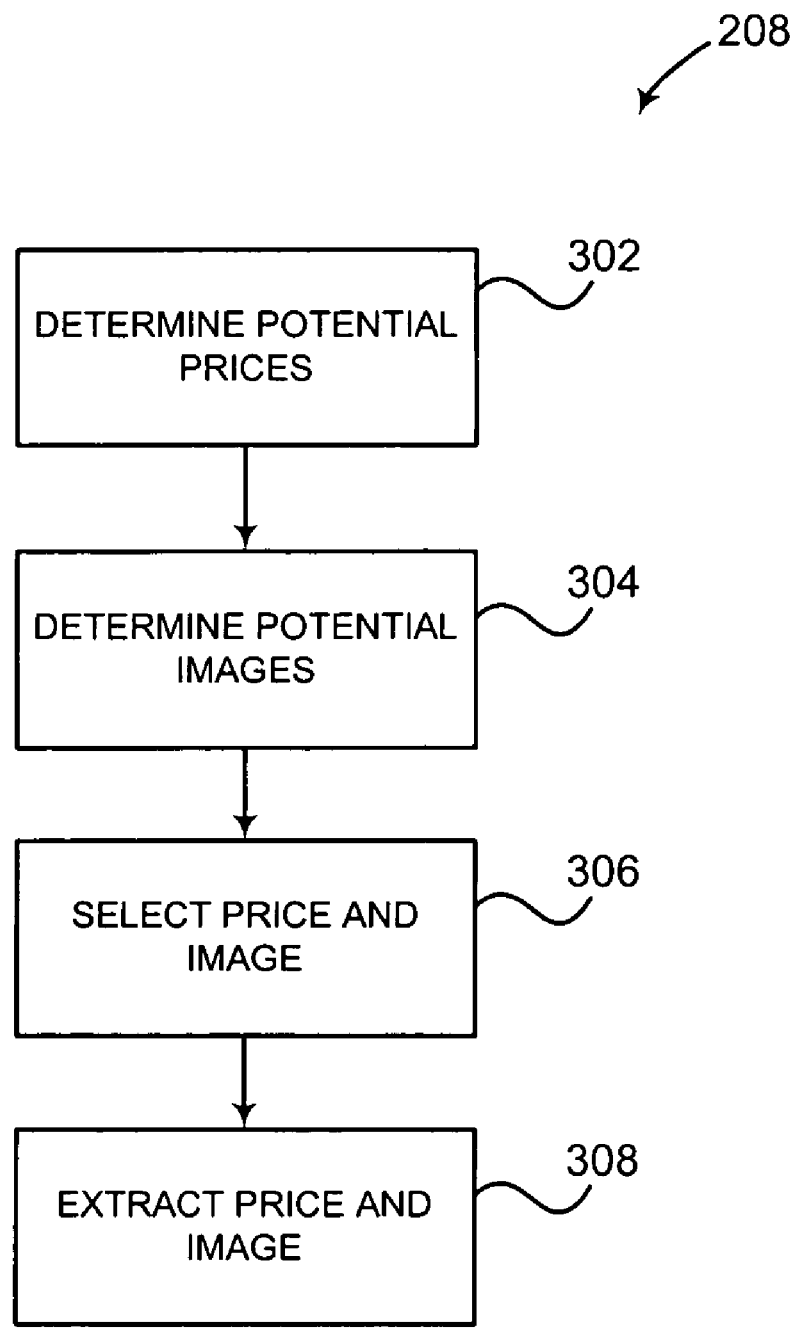
FIG. 3 is a flow diagram illustrating an example of a method of identifying and extracting price and image information for an item from an article in one embodiment of the present invention.

FIG. 3 illustrates an example of subroutine 208 and specifically illustrates an example of determining two attributes, price and image, for an item from a document. In 302, the attribute processor 132 determines a list of potential prices for the item. The attribute processor 132 can determine potential prices by examining the document and determining the price signals associated with each potential price. These price signals can include price representation, the font of the potential price, the proximity of the potential price to special words, and distance and structure metrics related to the potential price.

For example, each potential price can be given a price representation score that represents how well the price looks as a price. A price will typically have a currency indicator, such as "$", a number that is followed by a period, followed by two single digit numbers, such that a price may look like "$15.89". The font size of the potential price can be indicative that it is a price if it is a large font size. Font face can also indicate whether or not the potential price is an actual price. For example, a strikethrough font type can indicate that the potential price is not a price for the item. Terms immediately preceding the potential price, such as, for example, "our price", "your price", "sale price", and "sale" can indicate a price. Conversely, some words immediately preceding a potential price can indicate that the potential price is not an actual price, such as, for example, "starting at", "over", "about", "was", "save", "rebate", and "shipping". A country abbreviation, such as "US", immediately preceding or following the potential price can be indicative that it is an actual price.

The price or other attribute of an item is likely to be located in close proximity to the terms used in the search query for the item. Therefore, the attribute processor 132 can utilize various distance and structural metrics to determine the proximity of a potential price to a query term. One such distance metric is the number of words between a potential price and a query term. Other distance metrics can be used on documents having a tree structure. As is known to those skilled in the art, HTML documents have a hierarchical tree structure that can be formed by a plurality of small tree structures. For tree structured documents, the attribute processor 132 can determine the distance from a potential price to the closest common ancestor shared with a query term and the depth of the smallest tree containing both a potential price and a query term. The attribute processor can also use the structural metric of the number of nodes in the smallest tree that contains both a potential price and a query term to determine potential prices for an item.

Based on some or all of these price signals, the attribute processor 132 identifies potential prices for an item in a document and compiles a list of potential prices for an item from a document. In one embodiment, the attribute processor 132 can then sort and rank the list based on these same signals used in a decision tree. Other methods of sorting and ranking the list are possible.

In 304, the attribute processor 132 can determine potential images for an item from a document. As with determining potential prices for the item, the attribute processor 132 determines various image signals to identify the potential images associated with the item. Such signals can be, for example, various distance and structural metrics for potential images and query terms, various distance and structural metrics for potential images and potential prices, and global information regarding the potential image. Similar distance metrics and structural metrics as were used for identifying potential prices can be used for potential images and query terms and potential images and potential prices. Global information regarding the potential images, such as, the file type of the potential image, the size of the potential image, the aspect ratio of the potential image, and an occurrence value for the image can also be used by the attribute processor 132 to determine potential images. The occurrence value can be based on the frequency of occurrence of the image in the document and in the network. It is desirable to choose an image of the item that is a photograph or other representation of the item rather than a logo associated with the item or other undesirable image. Images can be indicated by files that have ".gif", ".jpeg", or ".jpg" extensions. Images that have odd aspect ratios or occur frequently on the document or in the network may be logos or other undesirable images. Additionally, a very large image or small image can signify that the image is not useful or appropriate.

Based on some or all of these signals, the attribute processor 132 compiles a list of potential images for an item from a document. In one embodiment, the attribute processor 132 can then sort and rank the list based on these same signals used in a decision tree. Other methods of sorting and ranking the list are possible.

In the 306, the attribute processor 132 selects the best potential price and the best potential image for an item from a document. The attribute processor can select the highest ranked potential price as the best potential price and can select the highest ranked potential image as the best potential image. Biasing the image and price selection to things near each other on the document can increase the quality of the selected image and price. In another embodiment, the best potential price is identified by the attribute processor 132 before the attribute processor 132 identifies the potential images.

In 308, the best potential price and best potential image from the document relating to the item are extracted by the attribute processor 132 and can be used in the compilation of a summary relating to the item for the document.

Returning now to FIG. 2, the attribute processor can identify and extract attributes for the requested item from relevant documents identified by the document locator 130. In 210, item attributes for each relevant document are compiled in a search result set.

In 212, the compiled search result set can be transmitted by the server device 104 to the client device 102a via the network 106. Alternatively, the search engine 120 can index and store the item attributes to be used in response to a search query from a user.

While the above description contains many specifics, these specifics should not be construed as limitations on the scope of the invention, but merely as exemplifications of the disclosed embodiments. Those skilled in the art will envision many other possible variations that are within the scope of the invention. The terms first and second are used herein merely to differentiate one item, article, or attribute from another item, article, or attribute. The terms first and second are not used to indicate first or second in time, or first or second in a list, or other order, unless explicitly noted. For example, the "second" may come in time or in a list before the "first," unless it is otherwise explicitly indicated.

That which is claimed:

1. A computer-implemented method for automatically extracting and displaying information about a product from a plurality of articles, the method comprising:
   in response to receiving a search query for a product, searching an index of articles that describe products for sale;
   identifying, based on the index searching, a plurality of articles from the index of articles that are responsive to the search query;
   obtaining, based on the search query, at least one price for the product and at least one image of the product from each of the identified articles by:
      automatically selecting and extracting a price for the product from a first article of the identified articles by:
         identifying a potential price in the first article;
         identifying a price signal associated with the identified potential price in the first article;
         determining, based on a proximity metric, whether the price signal indicates that the identified potential price is an actual price for the product;
         responsive to a positive determination, automatically extracting the actual price from the first article;
      automatically selecting and extracting an image for the product from the first article based on the extracted price;
      repeating the selection and the extraction of prices and images for other identified articles; and
   displaying, as a combined search result set, prices extracted and images extracted for the product from the identified articles.

2. The method of claim 1, wherein automatically selecting and extracting the image for the product based on the extracted price comprises determining a distance between a location of the extracted price for the product and a location of the image for the product within the first article.

3. The method of claim 1, wherein automatically selecting and extracting the image for the product comprises:
   determining a distance within the first article between a location of the extracted price for the product and a location of a term of the search query within the first article; and
   determining a distance within the first article between a location of the image for the product and a location of the term of the search query within the first article.

4. The method of claim 1, wherein the price signal comprises a font size of the identified potential price.

5. The method of claim 1, wherein the price signal comprises a font face of the identified potential price.

6. The method of claim 1, wherein the price signal comprises a word immediately preceding the identified potential price.

7. The method of claim 1, wherein the price signal comprises a word immediately following the identified potential price.

8. The method of claim 1, wherein automatically selecting and extracting the image for the product based on the extracted price comprises determining global information associated with the product.

9. The method of claim 8, wherein determining global information associated with the product comprises at least one determination selected from the group consisting of: determining a number of documents from a source associated with the first article, determining a frequency of occurrence of the image for the product on a network, and determining a size of the image.

10. The method of claim 1, wherein automatically selecting and extracting the image for the product comprises:
    identifying a potential image in the first article based on the extracted price;
    identifying an image signal associated with the identified potential image in the first article;
    determining whether the image signal indicates that the identified potential image is an actual image for the product; and
    responsive to a positive determination, automatically extracting the actual image from the first article.

11. The method of claim 10, wherein the image signal comprises a number of occurrence value associated with the identified potential image for the product.

12. The method of claim 10, wherein the image signal comprises a number of words within the first article between a location of the extracted price for the product, a location of the identified potential image for the product, and a location of a term of the search query.

13. The method of claim 1, wherein the first article has a tree structure.

14. The method of claim 10, wherein identifying the image signal further comprises:
    identifying a closest common ancestor to the extracted price for the product in a tree structure of the article and a term of the search query;
    determining a distance from the closest common ancestor to the identified potential image; and
    determining a distance from the closest common ancestor to the term of the search query.

15. The method of claim 13, wherein the image signal comprises a number of nodes in a smallest tree that contains a price for the product, an image for the product, and a term of the search query.

16. The method of claim 13, wherein the image signal comprises a depth of a smallest tree in the tree structure containing the price, the identified potential image for the product and a term of the search query.

17. The method of claim 1, wherein automatically selecting and extracting the price for the product from the first article comprises determining a best price from among a plurality of prices selected from the first article, and wherein automatically selecting and extracting an image for the product from the first article based on the extracted price comprises determining a best image from among a plurality of images selected from the first article.

18. The method of claim 1, further comprising:
    automatically selecting and extracting a second price for the product from a second article of the identified articles;
    automatically selecting and extracting a second image for the product from the second article based on the second price; and
    displaying in the combined search result set the second price and the second image for the product extracted from the second article.

19. The method of claim 1, wherein the price signal comprises a price representation score for the identified potential price that scores the degree to which the identified potential price appears to be an actual price.

20. The method of claim 1, wherein obtaining, based on the search query, at least one price for the product and at least one image of the product from each of the identified articles further comprises:

selecting a plurality of potential prices and a plurality of potential images for the product from the first article, the prices selected based on terms of the search query, the images selected based on the terms of the search query and based on the prices selected, wherein the selection includes a distance between a location of each of the prices within the first article and a location of each of the images within the first article; and making a ranked list of the potential prices and of the potential images selected for the product from the first article, wherein prices and images that are located nearer to each other within the first article are ranked higher than prices and images that are farther apart from each other.

21. A computer program product for automatically extracting and displaying information about a product from a plurality of articles, the computer program product comprising:

a computer-readable medium; and computer program code, encoded on the medium, for:

in response to receiving a search query for a product, searching an index of articles that describe products for sale;

identifying, based on the index searching, a plurality of articles from the index of articles that are responsive to the search query;

obtaining, based on the search query, at least one price for the product and at least one image of the product from each of the identified articles by:

automatically selecting and extracting a price for the product from a first article of the identified articles by:

identifying a potential price in the first article;

identifying a price signal associated with the identified potential price in the first article;

determining, based on a proximity metric, whether the price signal indicates that the identified potential price is an actual price for the product responsive to a positive determination, automatically extracting the actual price from the first article;

automatically selecting and extracting an image for the product from the first article based on the extracted price;

repeating the selection and the extraction of prices and images for other identified articles; and displaying, as a combined search result set, prices extracted and images extracted for the product from the identified articles.

22. A computer-implemented system for automatically extracting and displaying information about a product from a plurality of articles, the system comprising:

means for searching an index of articles that describe products for sale in response to receiving a search query for a product;

means for identifying, based on the index searching, a plurality of articles from the index of articles that are responsive to the search query;

means for obtaining, based on the search query, at least one price for the product and at least one image of the product from each of the identified articles by:

automatically selecting and extracting a price for the product from a first article of the identified articles by:

identifying a potential price in the first article;

identifying a price signal associated with the identified potential price in the first article;

determining, based on a proximity metric, whether the price signal indicates that the identified potential price is an actual price for the product;

responsive to a positive determination, automatically extracting the actual price from the first article;

automatically selecting and extracting an image for the product from the first article based on the extracted price;

repeating the selection and the extraction of prices and images for other identified articles; and means for displaying, as a combined search result set, prices extracted and images extracted for the product from the identified articles.

23. The method of claim 17, wherein determining the best price and the best image for the product comprises:

ranking the prices and the images selected from the first article;

selecting a highest ranked price for the product as the best price; and selecting a highest ranked image for the product as the best image.

24. The method of claim 23, wherein the ranking ranks based on the distance between each image and each price selected for the product.

25. The method of claim 23, wherein ranking ranks the price based on a price representation score of each price selected for the product.

26. The method of claim 23, wherein the best price is a price most likely to be correctly associated with the product.

27. The method of claim 23, wherein the best image is an image most likely to be correctly associated with the product.

28. The method of claim 10, wherein the image signal comprises an aspect ratio associated with the identified potential image.

29. The method of claim 20 further comprising:

identifying a highest ranked price from the potential prices on the ranked list for the first article; and automatically selecting and extracting the highest ranked price from the first article.

30. The method of claim 20 further comprising:

identifying a highest ranked image from the potential images on the ranked list for the first article; and automatically selecting and extracting the highest ranked image from the first article.

* * * * *